United States Patent
Desmond et al.

[15] 3,649,803
[45] Mar. 14, 1972

[54] FAST MOUNT OVEN

[72] Inventors: Richard J. Desmond, North Syracuse; Edward J. Fronczek, Auburn; John J. McCarthy, Port Bryon, all of N.Y.

[73] Assignee: General Electric Company

[22] Filed: May 4, 1970

[21] Appl. No.: 34,041

[52] U.S. Cl. ................................219/85, 29/497, 219/347, 219/388
[51] Int. Cl. .......................................................B23k 1/02
[58] Field of Search..............219/85, 79, 80, 347, 349, 354, 219/388, 405, 411; 29/497, 503, 626; 228/1, 4

[56] References Cited

UNITED STATES PATENTS

| | | | |
|---|---|---|---|
| 2,788,432 | 4/1957 | Moks | 219/85 |
| 3,465,116 | 9/1969 | Dix | 219/85 |
| 3,486,004 | 12/1969 | Morrone | 219/347 X |
| 3,053,969 | 9/1962 | Kerr et al. | 219/85 |
| 3,382,342 | 5/1968 | Dix et al. | 219/85 |
| 3,403,242 | 9/1968 | Cropp et al. | 219/85 |

Primary Examiner—J. V. Truhe
Assistant Examiner—L. A. Schutzman
Attorney—Robert J. Mooney, Nathan J. Cornfeld, Carl O. Thomas, Frank L. Neuhauser, Oscar B. Waddell and Joseph B. Forman

[57] ABSTRACT

An oven is disclosed including a track along which heat sink strips may be advanced for soldering to assembled elements, such as semiconductor elements. The oven includes a preheat station, a bonding station, and a post bonding station within the housing. An advancement mechanism moves the strips in stepped increments between the stations. The assembled elements associated with the strip are simultaneously engaged by a weighting and clamping head at the bonding station. Both reducing and cooling gases are blown onto the strips at the bonding station. A radiant heater element is located externally of the oven housing for heating the strips at the bonding station. At the preheat and post bonding stations ports are provided in the track to flush unwanted gases from the strips.

7 Claims, 10 Drawing Figures

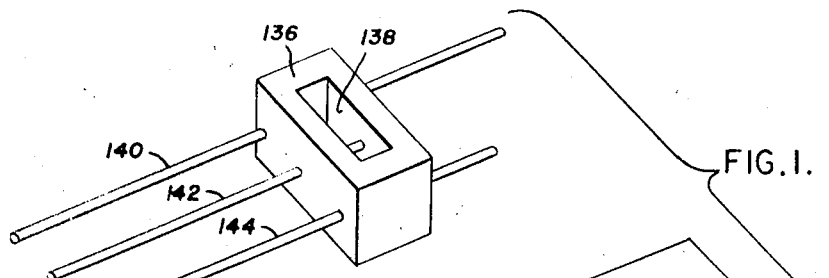
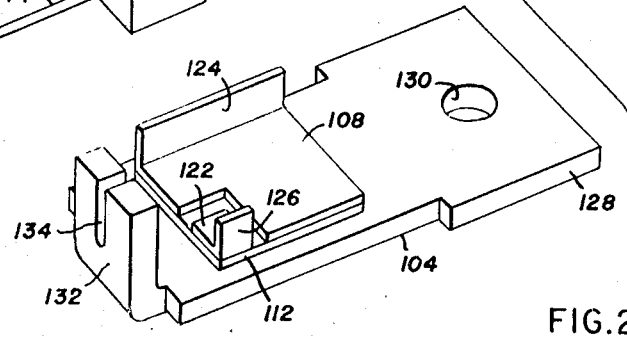
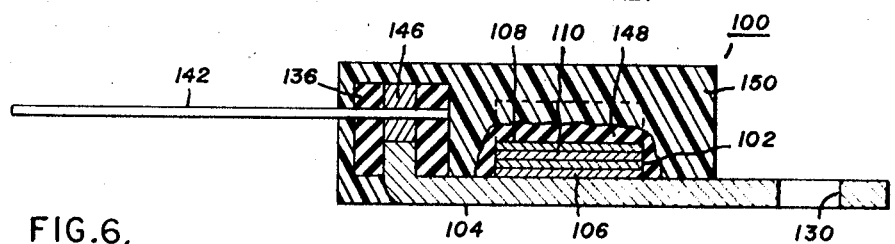
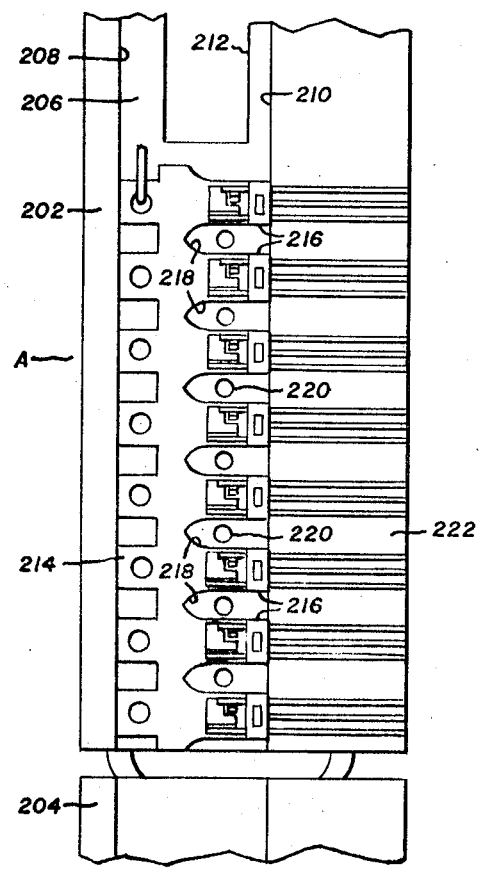
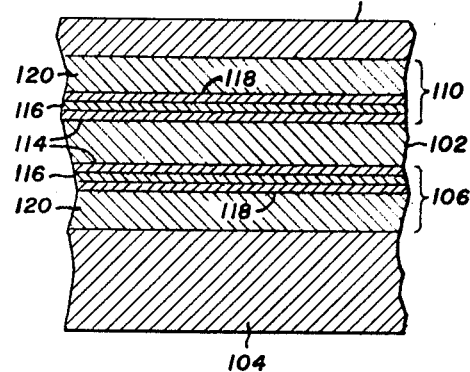
INVENTORS:
RICHARD J. DESMOND,
EDWARD J. FRONCZEK,
JOHN J. McCARTHY,
BY *Carl O. Thomas*
THEIR ATTORNEY.

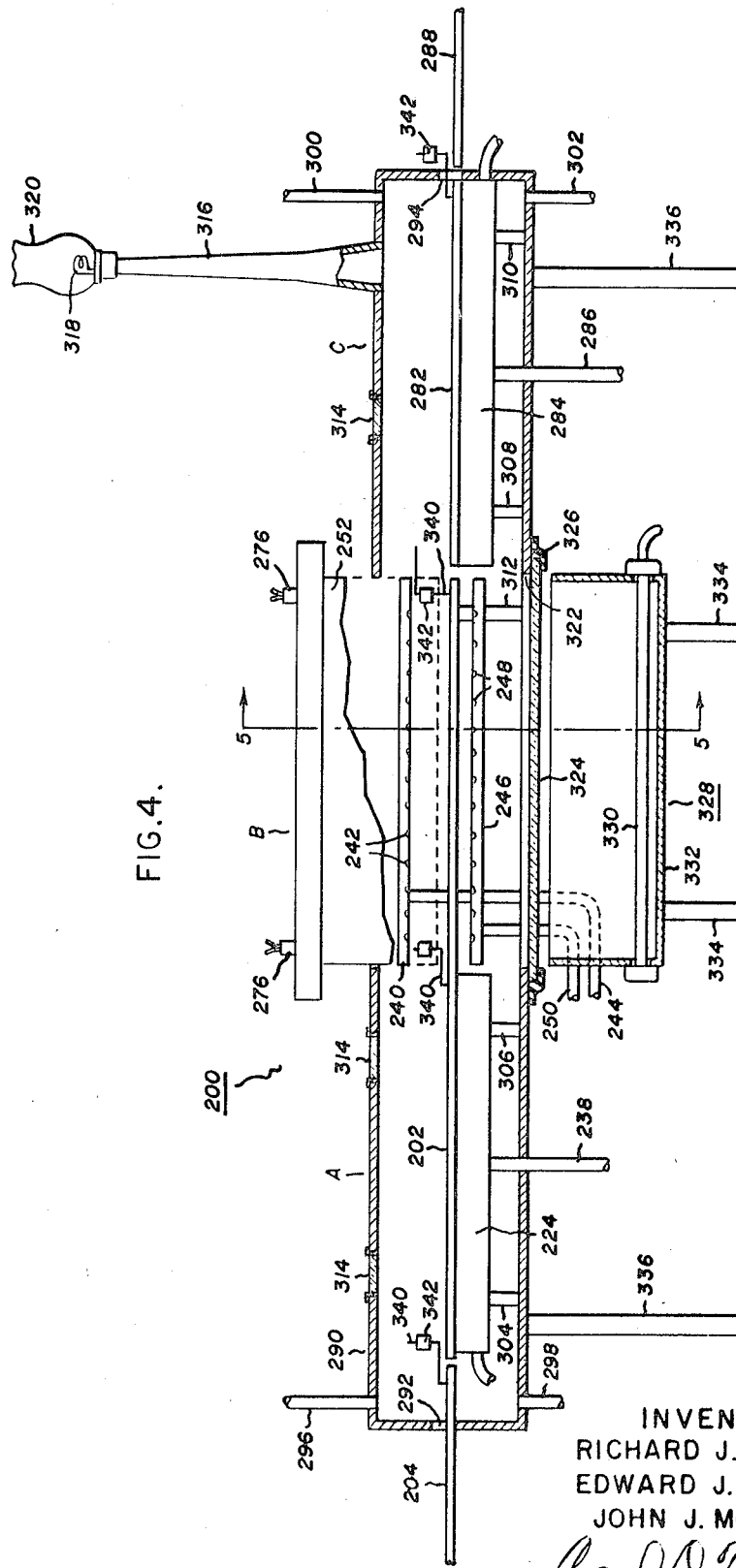

INVENTORS:
RICHARD J. DESMOND,
EDWARD J. FRONCZEK,
JOHN J. McCARTHY,

BY *Carl O. Thomas*
THEIR ATTORNEY.

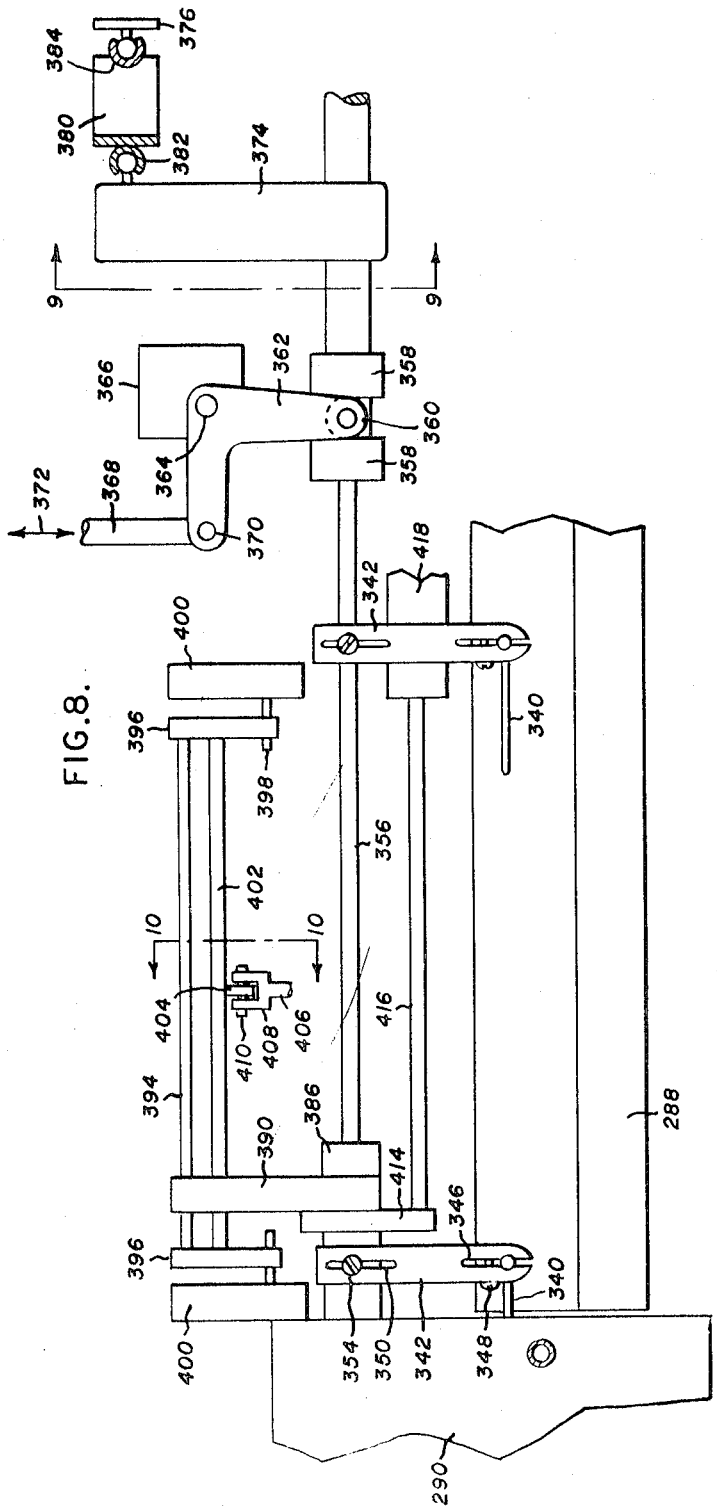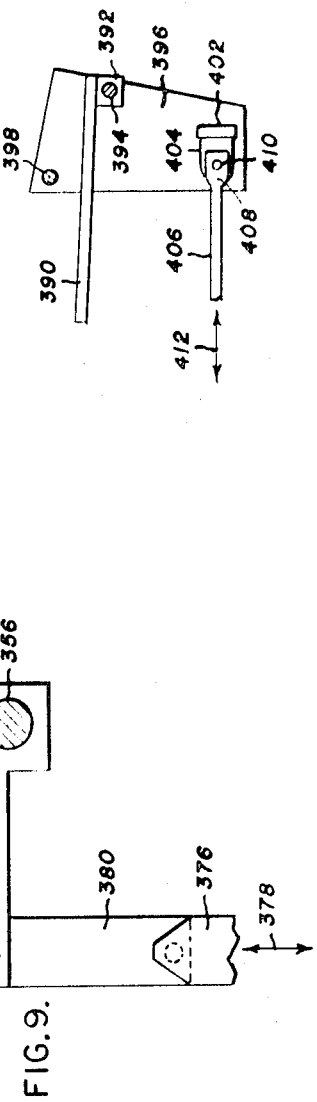
INVENTORS:
RICHARD J. DESMOND,
EDWARD J. FRONCZEK,
JOHN J. McCARTHY,
BY Carl O. Thomas
THEIR ATTORNEY.

FAST MOUNT OVEN

Our invention relates to a fast mount oven suitable for soldering partially preassembled units, such as semiconductor units, to a heat sink strip.

A variety of semiconductor devices are in use incorporating a generally flat heat sink stamped from a heat sink strip which is initially common to a number of devices. Construction of devices from common heat sink strips is advantageous in that it avoids the necessity of separately handling and positioning individual device elements during manufacture. Further, an entire heat sink strip may be as easily heated to a solder bonding temperature as an individual semiconductor device heat sink.

While our fast mount oven may be readily applied to the soldering of a variety of semiconductor devices of common heat sink strip genesis, it is considered that it may be most conveniently described by reference to a specific semiconductor device construction. An exemplary device suitable for soldering in heat sink strip form is illustrated in FIGS. 1 through 3 inclusive, in which FIG. 1 is an exploded perspective view of the semiconductor device prior to encapsulation;

FIG. 2 is a vertical section of the semiconductor device of FIG. 1 in its finally assembled state; and FIG. 3 is a sectional detail showing the association of an internal connector and a heat sink with a semiconductor body.

The semiconductor device 100 shown in FIG. 2 includes a semiconductor body or pellet 102 which is joined to an electrically conductive heat sink 104 by a group of bonding layers 106 and to an internal connector 108 by a group of bonding layers 110. For ease of illustration in FIG. 1 the semiconductor body and bonding groups are depicted as a single element 112. In FIG. 3 a preferred form of the bonding groups is shown. A conventional three layer contact system is adhered to opposite major surfaces of the semiconductor body. In a specific illustrative form the layers 114 next adjacent the semiconductor body may be formed of chromium, the layers 116 may be formed of nickel, and the layers 118 may be formed of silver. As is well understood in the art the function of the contact layers is to condition the surface of the semiconductor body so that it can be readily bonded to solder layers 120. The solder layers bond the semiconductor body to the heat sink and to the internal connectors.

Referring to FIG. 1, a second internal connector 122 is shown attached to the element 112 in laterally spaced relation to the internal connector 108. The internal connector 108 is provided with an upstanding flange portion 124 while the second internal connector is provided with an upstanding flange 126. The heat sink is provided with a laterally extending tab portion 128 having a centrally located aperture 130 to facilitate thermal engagement of the heat sink with a structure capable of receiving and dissipating heat, such as a chassis or a heat fin array. Along an opposite edge of the heat sink an upstanding foot portion 132 is integrally joined. As shown, the foot portion initially lies in the plane of the heat sink and is bent to a perpendicular orientation. The upper edge of the foot portion is provided with a groove 134.

A rigid insulative header 136 is provided with a central window 138 which is sized to slidably fit over the foot portion of the heat sink. The header carries three spaced parallel leads 140, 142, and 144. Leads 140 and 144 pass through the header without intersecting the window 138, but tangentially engage the outer surfaces of flanges 124 and 126 of the connectors. The leads are soldered to the upstanding flanges along their length to assure a low resistance electrical interconnection. The lead 142 is slidably fitted into the groove 134 in the foot portion of the heat sink and is soldered thereto at 146. The bonding group 110 underlies the internal connectors, but is interrupted so that it does not bridge the connectors. Accordingly, it is apparent that the lead 142 provides an electrical conduction path to the lower major surface of the semiconductor body, the lead 140 provides an electrical conduction path to a major portion of the upper surface of the semiconductor body, and the lead 144 provides an electrical conduction path to a laterally displaced portion of the upper surface of the semiconductor body. In the form shown the semiconductor body may be a transistor or a gate controlled thyristor semiconductor body. Where the semiconductor body is a diode or Shockley diode the lead 144 and connector 122 may be omitted. A passivant body 148 formed of a material such as silicon rubber is shown surrounding the semiconductor body exposed edges and a plastic housing 150 is shown molded to the heat sink and encapsulating the passivant material, semiconductor body, and header.

It is apparent that the semiconductor device 100 could be assembled by any of a number of conventional approaches. For example, the elements of the semiconductor device could be assembled by hand with each solder interconnection being individually formed. According to a preferred assembly procedure the semiconductor pellet 102 with the contact system applied to its opposed major surfaces is first soldered to the internal connectors 108 and 122 to form a sub-unit. The solder layer 120 between the semiconductor body and internal connectors may be provided by using a solder clad metal strip to form the internal connectors. It may be readily seen that this results in the flange portions 124 and 126 of the internal connectors being solder clad. The solder layer 120 between the sub-unit and the heat sink may be initially positioned as a separate preform. The header 136 carrying the device leads may be simply slipped over the foot portion 132 of the heat sink and a solder ball placed in the window 138 to provide the solder required for the interconnection at 146. At this stage of assembly it is merely necessary to heat the heat sink once in order to simultaneously solder the lead 142 to the foot portion of the heat sink, the semiconductor pellet to the heat sink, and the leads 140 and 144 to the flange portions 124 and 126, respectively. Where the heat sink is integrally united to other device heat sinks in a common strip, it is appreciated that a single heating of the strip can produce these same solder interconnections for all devices simultaneously. Thereafter, the passivant 148 and molded housings 150 may be associated with the devices by conventional techniques and the heat sinks separated from the common heat sink strip.

As is well understood in the art the soldering of semiconductor devices requires control of the maximum temperatures reached during soldering to avoid downgrading of electrical characteristics. Additionally, the temperature rise and fall before and after soldering must be gradual to avoid thermally induced stresses in the semiconductor pellet. Further, care must be taken to eliminate oxygen from the ambient atmosphere during soldering to avoid incurring high resistances in the solder joints. Where the solder has been exposed to the atmosphere so that surface oxidation may be present, it is preferred to expose the solder to a reducing atmosphere during heating.

In conventional soldering ovens and semiconductor device to be soldered is placed on a continuously moving belt. To hold parts to be soldered in proper registry fixtures and/or weights may be associated with the parts prior to introduction into the oven. As the parts to be soldered pass through the oven on the belt their temperature is gradually increased to a peak soldering temperature and thereafter gradually reduced. A cover gas which may be an inert and/or reducing gas is maintained in the oven. While such a conventional oven may be used to solder a device such as semiconductor device 100, it is by comparison to our oven large, expensive, and slow.

It is an object of our invention to provide an oven capable of soldering which is compact, comparatively inexpensive, and capable of quickly processing units such as, but not limited to, those including heat sink strips and semiconductor elements.

In one aspect our invention is directed to a fast mount oven comprising a preheat station which includes means for mounting a thermally conductive carrier having located thereon sub-units having solder associated therewith for bonding to the sub-units. Means are provided for preheating the carrier to a temperature mediate atmospheric temperature and the solder bonding temperature, and means are provided for sweeping residual oxygen from association with the solder and the sub-units. A bonding station includes means for applying radiant heat to the carrier, means for selectively and simultaneously weighting the sub-units at the bonding station, means for sweeping the sub-units with a cover gas while the solder is heated to its bonding temperature, and means for controllably cooling the solder to below its hardening temperature while the sub-units are still weighted. A post bonding station is provided for cooling the heat sink strip at a controlled rate while sweeping the sub-units with a cover gas. A common housing surrounds the preheat, bonding, and post bonding stations, and means are provided for advancing in stepped increments and indexing the carrier within the housing.

Our invention may be better understood by reference to the following detailed description considered in conjunction with the drawings, in which FIG. 4 is a vertical section with parts broken away of our fast mount oven, FIG. 5 is an enlarged sectional view taken along section line 5—5 in FIG. 4;

FIG. 6 is an enlarged plan view of the preheat station portion of the apparatus of FIG. 4, showing a heat sink strip in place;

FIG. 8 is a plan view, to an enlarged scale, of a portion of the advancement mechanism;

FIG. 9 is a section taken along section line 9—9 in FIG. 8; and

FIG. 10 is a section taken along section line 10—10 in FIG. 8.

Referring to FIG. 4, the fast mount oven 200 is provided with a strip mounting track 202 which is common to the preheat station A and the bonding station B. An aligned, but laterally spaced, track 204 extends into the oven to allow strips to be fed to the mounting track. The lateral spacing minimizes heat loss from the track 202 to the track 204.

Figure 7:
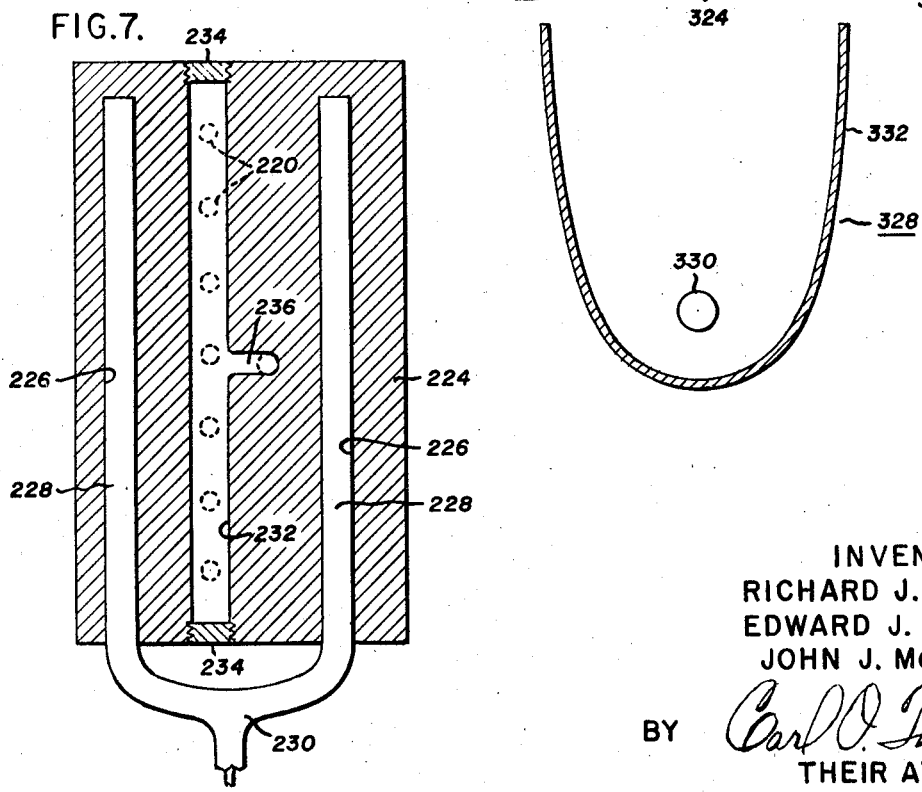
FIG. 7 is an enlarged scale, sectional view of the heater block for the preheat station.

The preheating station A can best be appreciated by reference to FIGS. 4, 6, and 7. The track 202 is provided with a relieved bed 206 and guide shoulders 208 and 210 adjacent its edges. The portion of the bed extending to the bonding station B is provided with an aperture 212. As shown in FIG. 6 a metallic, thermally conductive heat sink strip or carrier 214 is positioned on the bed between the guide shoulders. The strip is provided with regularly spaced sub-units 216 mounted thereon for soldering. The subunits as shown are comprised of the header, leads, internal connectors, semiconductor body, and solder previously described in connection with device 100. The strip is provided with relieved portions 218 between adjacent sub-units. Ports 220 are aligned with the relieved portions of the strip and are interdigitated with the sub-units, so that a port separates each adjacent sub-unit. The track is provided with an apron 222 that horizontally supports the leads extending laterally from the sub-units.

Beneath the track at the preheat station a heater block 224 is provided. The heater block may be cast from a single block of a thermally conductive metal such as copper, aluminum, nickel, or steel. As shown the block is provided with two longitudinally extending bores 226 into which are fitted two electrical resistance heating elements 228. The electrical heating elements are preferably connected electrically in parallel. The number or electrical interconnection of the heating elements is not critical, but may be varied as desired. In the preferred form the electrical resistance elements are electrically insulated from the heater block while being thermally coupled thereto by a thermally conductive, electrically insulative material such as aluminum oxide. The object is to obtain relatively uniform heating of the heater block. Between the heater elements a bore 232 is provided closed at opposite ends by plugs 234. The ports 220 are the upper ends of passages which extend downwardly through the track and through the heater block to intersect the bore 232. A lateral conduit 236 is centrally positioned to connect the bore 232 with a fluid delivery conduit 238.

Figure 5:
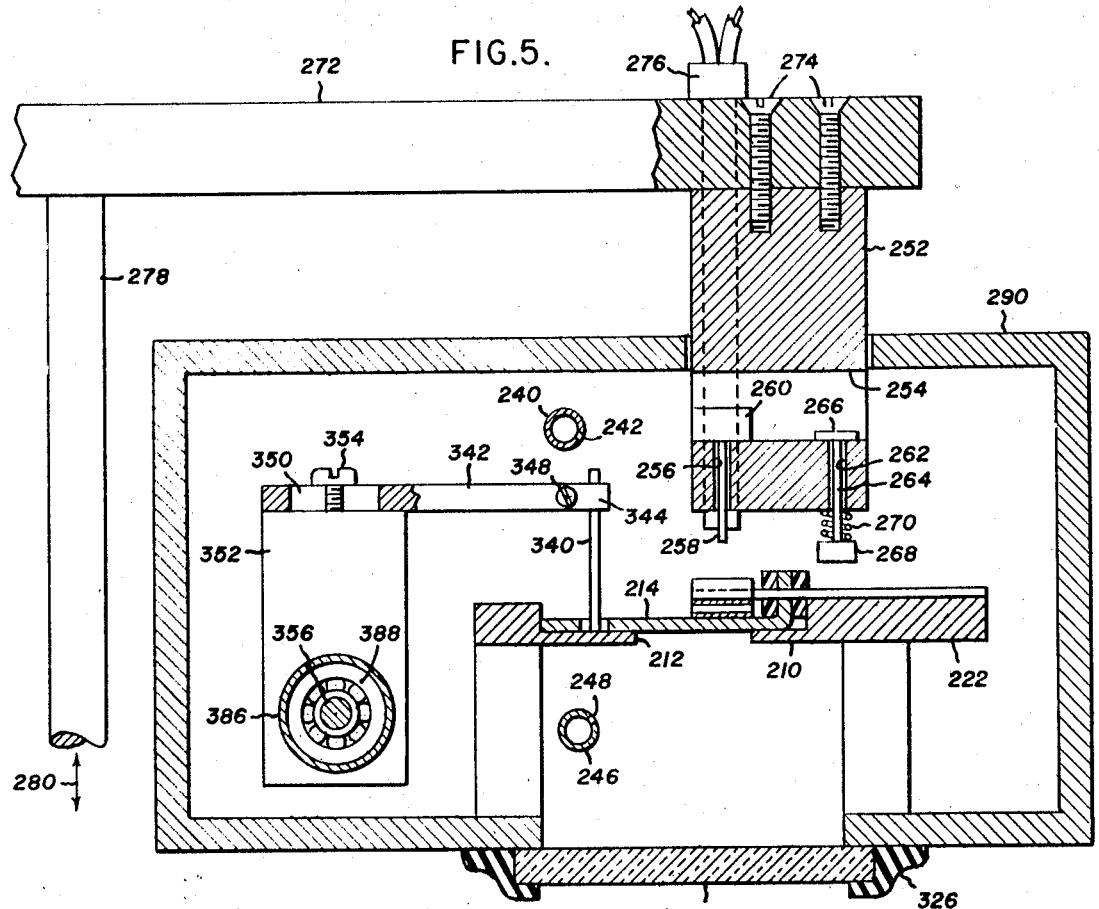

The bonding station B of our fast mount oven is best understood by reference to FIGS. 4 and 5. The aperture 212 in the track runs the full length of the bonding station. A fluid conduit 240 having regularly spaced ports 242 also runs the full length of the bonding station and is located parallel to the track. A fluid delivery conduit 244 is associated with the fluid conduit 240. An additional fluid conduit 246 is similarly mounted to run the length of the under side of the bonding station and is also provided with regularly spaced ports 248. The additional fluid conduit 246 is connected to fluid delivery conduit 250. A head 252 also runs the length of the bonding station. The head is provided with a slot 254 which extends laterally over each sub-unit when the strip is positioned at this station. A plurality of apertures 256 are positioned for vertical alignment with the sub-units and, more particularly, the semiconductor element portion of the sub-units. A pin 258 extends through each aperture and is connected to a weight 260 located within the slot. Apertures 262 are also provided adjacent opposite extremities of the slot and may also be provided at such intermediate intervals as desired. A pin 264 is provided within each aperture 262. Each pin is provided with a retaining head 266 within the slot to limit downward travel of the pin and a common clamp bar 268 is associated with the opposite end of the pins. A compression spring 270 is shown associated with each pin and interposed between the common clamp bar and the head. The head is supported by a control arm 272 shown attached to the head by bolts 274. At opposite ends of the head thermocouple sensor units 276 are located so that they extend downwardly through the control arm and head to engage the opposite extremities of the heat sink strip when the head is in its lower position as opposed to the upper position shown. A shaft 278 is connected to the control arm to move the control arm and the head vertically. The control arm may be moved rectilinearly along the axis indicated by arrow 280 by a conventional mounting and actuating mechanism, not shown. For example, the control arm may be attached to a piston within a hydraulic cylinder or to a solenoid.

The post bonding station C is comprised of a track 282 which may be identical to the portion of the track 202 adjacent the preheat station A. A header block 284 is provided which may be identical to heater block 224 and is provided with a fluid conduit 286. To prevent heat loss from the bonding station the track 282 is laterally spaced from (but aligned with) the track 202. A laterally spaced terminal track 288 is positioned to receive the bonded strips as they are removed from the oven.

As best illustrated in FIGS. 4 and 5 the oven is provided with a housing 290 surrounding the preheat, bonding, and post bonding stations for the purpose of controlling the atmosphere present at these stations. The oven is provided with a receiving opening 292 and an exit opening 294 through which strips may be fed to and removed from the oven. Conduits 296 and 298 are provided above and below the receiving opening for delivering an entrance-screening flow of inert or reducing gas. Similar conduits 300 and 302 are provided above and below the exit opening for delivering an exit-screening gas flow. Supports 304 and 306 are provided to support the heater block 224 in position within the housing while supports 308 and 310 are provided to similarly support the heater block 284. A support 312 is provided to support the end of the track 202 remote from the heater block 224. The upper portion of the housing is provided with openings within which transparent windows 314 are sealingly mounted. A stack 316 is mounted by the upper portion of the housing over a terminal portion of the post bonding station. An electrical ignition filament 318 is located adjacent the upper terminus of the stack, and a lamp globe 320 is provided to confine the gases while they are being burned. The lower portion of the housing adjacent the bonding station is provided with an aperture 322. A transparent pane 324 is mounted over the aperture by an edge seal 326.

Beneath the pane and below the oven housing a heating unit 328 is provided. The heating unit consists of an electrical infra-red heating element 330 of conventional construction which is releasably mounted by a parabolic focusing reflector 332. The infra-red heating unit is positioned by legs 334. The oven housing is mounted in position by legs 336.

In order to move strips through the oven in controlled stepped increments so that the strips are accurately indexed at each station an advancement mechanism is provided. As schematically shown in FIG. 4 a minimum of four fingers 340 are provided to engage the strip and advance it along the tracks. Each finger is supported in position by a finger holder 342. The structure of the advancement mechanism may be best appreciated by reference to FIGS. 5, 8, 9, and 10. While most of the fingers are shown extending both downwardly and laterally from the finger holders, they may all extend downwardly only, except for the finger that extends through the exit opening 294. The fingers are releasably and adjustably mounted by the finger holders. The forward end 344 of each finger holder is provided with a slot 346 into which the finger is fitted. An adjustment screw 348 controls the compression with which the finger is held by the finger holder. The rear extremity of each finger holder is provided with a slot 350 whereby the finger holder may be adjustably positioned on a mounting block 352 by a mounting screw 354.

The mounting block associated with the right hand finger and finger holder in FIG. 8 is fixedly secured to a mandrel 356 having its longitudinal axis positioned parallel with the bed of the track 288. To allow the mandrel to be shifted through a fixed increment along its longitudinal axis spaced collars 358 are fixed to the mandrel. An actuator knob 360 is fitted into the space between the collars and is rotatably associated with a shift arm 362. The shift arm is pivotally associated with a mounting pin 364 supported by a mounting block 366 fixedly positioned with respect to the track by interconnecting structure, not shown. The shift arm also has rotatably associated with it an actuator arm 368 having a rotatable pin connection 370. The actuator arm may be moved back and forth through a fixed increment as indicated by arrow 372.

In order to permit the mandrel to be rotated about its longitudinal axis through a fixed angular distance a rotator arm 374 is fixedly secured to the mandrel. A second actuator arm 376 capable of rectilinear movement through a fixed increment indicated by arrow 378 in FIG. 9 is connected to the rotator arm by an intermediate strap 380 having ball joint interconnections 382 and 384 to the rotator arm and the second actuator arm, respectively.

The mounting blocks for the fingers and finger holders shown in FIG. 4, in other words those fingers intended to move the strips within and from the oven housing, are mounted by a tube 386 which is rotatably and slidably mounted on the mandrel by bearings 388 journaled therebetween. To facilitate rotation of the tube on the mandrel a rotation bar 390 is secured at one end to the tube and is provided at its opposite end with a sleeve 392 that is slidably and rotatably fitted over a guide shaft 394. The guide shaft is fixedly secured at its opposite ends to rockers 396. The rockers are in turn rotatably supported by pins 398 mounted by supports 400. The supports may be fixedly related to the oven and track as desired. A connector bar 402 also extends between the rockers and has attached thereto a tongue 404. A control rod 406 has formed integrally a yoke 408 at one end which is joined to the tongue by a pin 410 permitting relative rotation between the tongue and yoke. The opposite end of the control arm may be connected to any conventional actuator mechanism capable of imparting rectilinear movement along an axis indicated by arrow 412 in FIG. 10.

The tube 386 may be moved longitudinally along the mandrel 356 by collar 414. The collar is mounted to the tube so that it is capable of rotation with respect to the tube, but is held against longitudinal movement with respect thereto. A control rod 416 is fixed to the collar at one end and may be associated with a piston fitted within hydraulic control cylinder 418 at its opposite end. Suitable spaced supports may be provided to support the tube and/or mandrel as required. These supports are not shown since they may be of any conventional construction capable of permitting the tube and/or mandrel to move longitudinally and rotatably with respect thereto.

In operation, a strip 214 is fed to the oven on track 204. The strip may be fed into the oven manually, but is preferably fed by the advancement mechanism in stepped increments corresponding to the spacing of the sub-units 216 on the strip. Although not shown in the drawings, this may be accomplished by extending the mandrel 356 through the oven housing 290 past the forward end of the oven and attaching a finger and finger holder to the mandrel similarly as the right hand finger and finger holder shown in FIG. 8. The right hand finger and finger holder shown in FIG. 8 similarly moves the strips withdrawn from the oven along the terminal track 288 in stepped increments corresponding to the spacing of sub-units.

This stepped advancement to and from the oven in stepped increments corresponding to the spacing of sub-units can be best appreciated by reference to FIGS. 8 through 10 inclusive. Initially a strip 214 is positioned beneath the right hand finger in FIG. 8 while the second actuator arm 376 is in its lower position. Thus the rotator arm 374 is rotated downwardly and the finger holder 342 is rotated upwardly so that the finger 340 is spaced upwardly from the track. When the second actuator arm moves upwardly, the mandrel 356 and the finger holder are rotated downwardly so that the finger is returned to a position in proximity with the track. With the strip positioned beneath the finger it will enter an aperture or other regularly recurring relieved portion of the strip. The actuator arm 368 is then moved toward the track as indicated by arrow 372 so that the actuator knob 360 is moved laterally away from the oven. The actuator knob engages a collar 358 to move the mandrel 356 longitudinally which in turn moves the finger and finger holder. This advances the strip through one stepped increment. To move the strip through another stepped increment, the finger again is raised, returned to its initial position and the cycle is repeated.

It is then to be noted that the movement of the strip to and from the oven by fingers mounted by the mandrel does not advance the strips through the oven, since this is accomplished by the fingers mounted by the tube 386. The four fingers shown in FIG. 4 are mounted by the tube and are simultaneously raised above the tracks by moving the control rod 406 to the left in FIG. 10. This rotates the rockers 396 about the pins 398 rotating the rotation bar 390 and the tube 386 to which it is fastened. This rotates the fingers and finger holders mounted by the tube above the tracks. When a strip is advanced along track 204 so that it underlies the upraised left hand finger in FIG. 4, the control rod may be moved to the right in FIG. 10 causing the fingers and finger holders to be rotated so that the lower ends of the fingers lie in proximity with the tracks. The left hand finger may enter an aperture in the strip or another relieved portion. The strip is then pulled to the preheat station A on the track 202. This is the position shown in FIG. 6. Advancement along the track 202 is accomplished by the control rod 416 pulling the tube 386 along the mandrel 356. The control rod 416 is controlled by the hydraulic cylinder 418. To return the fingers to their original position they are again rotated so that their lower ends are spaced above the tracks and the control rod 416 is used to again slide the tube 386 along the mandrel to the starting position, which is that shown in FIG. 8. It is to be noted that the rotation bar 390 does not prevent sliding movement of the tube, since the sleeve 392 associated with the rotation bar is slidably and rotatably fitted to the guide shaft 394. This also has the advantage of allowing the fingers to be moved longitudinally along the tracks either in a raised or a lowered position. Another feature to be noted is that the stepped increment through which the four fingers shown in FIG. 4 are moved is much greater than the stepped increments which may be used to advance the strips outside the oven. The purpose in providing this arrangement is to permit an entire strip to be moved to an oven station in a single increment of advancement, whereas assembly and treatment stations which may be present before and/or after the oven are free to have the strips advanced with respect thereto from sub-unit to sub-unit.

As the strip enters the oven housing 290 the conduits 296 and 298 blow an inert and/or reducing gas, such as nitrogen or argon and/or hydrogen. The conduits thus produce a gas curtain that minimizes any tendency of the ambient air from entering the oven housing. Instead, the gas supplied to form the curtain may itself in part be exhausted through the receiving opening 292. Despite the inlet gas curtain, however, some residual oxygen will remain in association with the strip. Accordingly, the strip is positioned at the preheat station so that the ports 220 are interdigitated with the sub-units 216. A reducing gas supplied to the ports by conduit 238 quickly sweeps this residual oxygen away. At the same time the reducing gas may contact the sub-units to initiate reduction of surface oxides associated with the elements to be soldered.

To protect the elements associated with the strip, particularly the semiconductor elements, from thermal shock caused by rapidly heating the strip to the solder melting temperature, the resistance heater elements 228 are controlled so that the heater block 224 and the portion of the track 202 associated therewith is brought to a temperature somewhere between the actual soldering temperature and the temperature of the ambient atmosphere. The heating of the units at this station can also have an accelerating influence on oxide reduction. The reducing gas supplied by the ports may be entirely heated in the heater block, if desired, or partially preheated externally of the oven. An inert gas may be used rather than a reducing gas for many applications.

In the next stepped increment of travel the advancement mechanism next draws the strip to the bonding station B. This places the strip in the position shown in FIG. 5. The head 252 is moved downwardly by the control arm 272 which is in turn moved by the shaft 278. The shaft moves downwardly along the axis indicated by arrow 280. The pins 258 each engage an internal connector overlying a semiconductor element so that the weights 260 urge the semiconductor element downwardly toward the heat sink strip 214 with the solder preform interposed therebetween. At the same time the clamp bar 268 compressively engages the leads of the sub-units. In the form shown the compression springs 270 press the clamp bar downwardly, but in an alternate form the springs may be omitted and the weight of the clamp bar may be relied upon. The leads are prevented from moving downwardly by the skirt portion 222 of the track 202. At the same time a reducing gas, which may be preheated, is blown downwardly from the ports 242 of the gas conduit 240. This assures a reducing atmosphere adjacent the sub-units during soldering. To bring the strip up to the soldering temperature the infra-red heating element 330 delivers radiant energy to the undersurface of the strip. It is to be noted that the undersurface of the strip is exposed by reason of the aperture 212 in the track and by the transparent pane 324 associated with the oven housing. The reflector 332 increases the effectiveness of the radiant heating element and may be formed to focus the radiant energy on the undersurface of the strip selectively, if desired.

The radiant heating element is capable of quickly bringing the strip to the melting temperature of the solder associated therewith. Since the strip has been preheated little risk of thermally induced stresses is incurred by the rapid heating. The thermocouple sensor units 276 engage opposite ends of the strip during bonding. In one form a thermocouple sensor unit may be relied upon to produce a signal when the strip temperature exceeds a predetermined maximum so that the power or voltage supplied to the radiant heater element can be cut back to a base or hold level. The remaining thermocouple unit may be used to produce a signal when the temperature of the strip lies below a predetermined minimum value to cause the output of the radiant heater element to be increased to its maximum or normal bonding level. It is considered that various control arrangements and circuits for their utilization are known to the art and may be readily applied to achieve the necessary temperature control necessary for bonding. In a preferred mode of operation the radiant heater element always delivers heat at some base level to avoid any possibility of abruptly cooling and thereby damaging the units being bonded.

After the solder associated with the sub-units has been brought to its bonding temperature for the desired time, it is desired to cool the strip in an accelerated but controlled manner. To accomplish this the output of the radiant heater element is cut back to its low level and at the same time a cooling gas is blown against the underside of the strip. The cooling gas is blown from portions 248 in conduit 246 and may be a reducing and/or inert gas. During cooling at the bonding station the head remains in its lower position. This minimizes any possibility of elements becoming misaligned while the solder is hardening.

When the solder temperature has dropped to a predetermined point so that the solder joints are formed and hardened, the advancement mechanism moves the strip from the bonding station to the post bonding station C. At the post bonding station the object is to regulate the cooling of the strip to a temperature mediate that of the atmosphere and the bonding station. This reduces risks of inducing stresses into the sub-units, particularly into any semiconductor elements. The post bonding station may be generally similar to the preheat station and may be operated in like manner. The reducing gas that is supplied through ports interdigitated with the sub-units performs a sweeping action as at the preheat station. At the post bonding station, however, the material to be swept away is not limited to residual oxygen, but may include any materials vaporized at the bonding temperatures which would otherwise tend to condense. For example, where the header 136 is formed of a plastic, it may contain a volatilizable material, such as a plasticizer. Referring to FIG. 5, it can be seen that the header is somewhat removed from the heating sight and is shielded from the radiant energy source. This reduces its maximum temperature. Still, however, the heat sink strip is a thermal conductor and it is essential to secure bonding within the window of the header that it be heated during soldering. Accordingly, a component of the header may produce vapors at the bonding station and possibly at the post bonding station also. Sweeping the sub-units with a gas reduces any tendency toward vapor condensation, which can be very detrimental to semiconductor element performance.

The advancement mechanism next moves the strip from the post bonding station to the track 288 exterior of the oven housing. Thereafter the strip may be advanced for subsequent handling and/or treatment in stepped increments corresponding to the spacing of sub-units, as previously described. In order to prevent any condensable vapors from following the strip out the exit opening 294 of the oven housing the stack 316 is provided. Thus, the cooling exhaust gases from the oven are separated from the product. Should the out gases represent a combustible product the igniter 318 can be relied upon to assure their combustion. The conduits 300 and 302 form a curtain of inert gas adjacent the exit opening of the oven to avoid any tendency of air to diffuse into the oven housing. For most applications it is preferred that the interior of the oven housing be maintained at a positive pressure to further minimize any tendency of air to enter the housing.

While we have described the operation of our oven in terms of a single strip or carrier moving through the oven, it is appreciated that strips or carriers may be present at all stations simultaneously. Further, different modes of operation may be suggested by different device characteristics. For example, where the sub-units to be bonded are formed entirely of the header and leads, the pins 258 and weights 260 may be omitted, although the clamp bar could still serve a valuable function. If, instead, the internal connectors, semiconductor element, and solder preform were to comprise the entire sub-units, the clamp bar could be omitted. If it were desired to weight these units just prior to entering the oven housing, as is conventional practice, the head 252 together with the pins and clamp bar could be entirely omitted, although this is deemed a less advantageous approach. The preheat station or the post bonding station could be extended so as to occupy two or more stepped increments of advancement, if desired. The advancement mechanism could be adjusted to provide smaller stepped increments where smaller numbers of units are to be formed from a single strip or individual units are to be processed. The radiant heater element could, if desired, be located within the oven housing. While the positive pressure within the oven housing can be relied upon to prevent oxygen ingress through the spacing between the housing and head, a sliding seal between these elements could be provided, if desired. Alternately, a flexible accordion seal could be attached to the head and housing.

While we have described our oven in terms of a specific soldering application in which the carrier—in this case the heat sink strip—is bonded to the sub-units, it is appreciated that the carrier for many applications will form no part of the finished product. For example, our oven may be used to bond metallic back up plates to semiconductive elements. Each unit leaving the oven would be comprised of a semiconductive element and one or more back up plates bonded thereto, with a layer of solder bonded between each back up plate and the semiconductive element. The carrier may simply take the form of a thermally conductive pallet on which one or more units are transported through the oven.

Still other variations will readily occur to those skilled in the art. It is accordingly intended that the scope of our invention be determined by reference to the following claims.

What we claim and desire to secure by Letters Patent of the United States is:

1. A fast-mount oven comprising
  a longitudinally extending first track for supporting a plurality of thermally conductive carriers to be successively indexed therealong,
  a longitudinally extending housing surrounding said track and having an entrance aperture opposite the beginning of said first track and an exit aperture opposite the end of said first track,
  said first track having a longitudinal slot intermediate its length defining a bonding station,
  a radiant heat source beneath said slot for heating the portions of carriers exposed by said slot,
  an apron on said first track for supporting selected portions of subunits mounted on said carriers during heating thereof,
  vertically movable weighting means at said bonding station engageable with subunits on carriers registered with said slot for clamping said subunits during heating thereof,
  a cover gas supply manifold above said slot for directing cover gas on carriers in registry with said slot,
  an initial gas supply manifold adjacent said slot for supplying initial cooling gas to carriers in registry therewith in sequence with heating thereof,
  curtain gas supply means adjacent the entrance and exit apertures of said housing for blocking extraneous air flow into said housing through said entrance and exit apertures,
  an exhaust gas stack in said housing adjacent the exit aperture for carrying off purged gases and heat-produced evaporants and preventing the flow of such evaporants out the exit aperture in condensing relation with carriers emerging therefrom,
  a preheat station situated between the bonding station and the beginning of said first track and including carrier preheating means disposed opposite said first track,
  said preheating means including a purging gas supply manifold having gas discharge ports spaced for registry with selected locations on carriers supported by said first track,
  a post-bonding station situated between the end of said first track and said bonding station and including means controlling the final cooling of carriers heated at said bonding station,
  and means for indexing successive carriers along said first track.

2. A fast mount oven according to claim 1 additionally including a second track extending through said entrance aperture in longitudinal alignment with said first track but thermally insulatingly spaced therefrom, and
  a third track extending through said exit in longitudinal alignment with said first track but thermally insulatingly spaced therefrom.

3. A fast mount oven according to claim 1 in which said means for applying radiant heat to the thermally conductive carrier includes means for focusing radiant heat on the carrier.

4. A fast mount oven according to claim 1 in which said housing includes a portion transparent to radiant energy and said radiant heat source for applying heat to the carrier is located externally of said housing.

5. A fast mount oven according to claim 1 additionally including means for sensing the temperature of the carrier at said bonding station and for adjusting the output of said heat applying means in response thereto.

6. A fast mount oven according to claim 1 in which the subunits include thermally destructible headers and said first track includes a shield interposed between the carrier and said radiant heat applying means, said track thereby blocking radiant heat from reaching the header and having an aperture therein to permit radiant heat to be applied directly to the carrier.

7. A fast mount oven according to claim 1 in which said indexing means includes means for advancing the carrier in first stepped increments and means for advancing the carrier in the vicinity of said stations in second stepped increments which are a multiple of said first stepped increments.

* * * * *